United States Patent [19]

Hagensick

[11] Patent Number: 5,073,919
[45] Date of Patent: Dec. 17, 1991

[54] AUTOMATICALLY TESTING TELEPHONE LINES

[75] Inventor: Thomas E. Hagensick, Deerfield, Ill.

[73] Assignee: Teradyne, Inc., Boston, Mass.

[21] Appl. No.: 595,246

[22] Filed: Oct. 10, 1990

[51] Int. Cl.⁵ .......................... H04M 1/24; H04B 3/46
[52] U.S. Cl. .......................................... 379/29; 379/24; 379/30; 379/6
[58] Field of Search ................... 379/23, 21, 24, 27, 379/28, 29, 30, 6

[56] References Cited

U.S. PATENT DOCUMENTS

| | | |
|---|---|---|
| Re. 30,692 | 7/1981 | Ellson .................................. 324/62 |
| 3,739,107 | 6/1973 | Spencer . |
| 4,169,220 | 9/1979 | Fields . |
| 4,413,163 | 11/1983 | Basini . |
| 4,521,643 | 6/1985 | Dupuis . |
| 4,602,134 | 7/1986 | Atkinson ...................... 340/815.02 |
| 4,639,557 | 1/1987 | Butler et al. ......................... 379/29 |
| 4,679,224 | 7/1987 | Lynch .................................. 379/26 |
| 4,686,697 | 8/1987 | Shapiro ............................... 379/38 |
| 4,707,850 | 11/1987 | Horton ................................. 379/29 |
| 4,864,598 | 9/1989 | Lynch ................................... 379/6 |
| 4,943,993 | 7/1990 | Fore .................................... 379/29 |

Primary Examiner—Stafford D. Schreyer

[57] ABSTRACT

A method of testing a telephone line including installing a test call unit at an end of the telephone line at which a customer's equipment is connected, automatically initiating a telephone line test at the module, performing the telephone line test, and transmitting the results of the line test over the telephone line.

47 Claims, 19 Drawing Sheets

AUTOMATICALLY TESTING TELEPHONE LINES

FIELD OF THE INVENTION

The invention relates to automatically testing telephone lines.

Telephone lines may consist of a variety of communications path medias (e.g., copper wire, fibre optics, radio) and information is transmitted in either analog or digital mode. Telephone companies automatically, periodically test telephone lines employing automated subscriber loop testers, as described in Ashdown et al. U.S. Pat. No. 4,139,745 and Ashdown et al. U.S. Pat. No. 4,113,998 and commercially available from Teradyne, Inc. under the 4TEL trade designation. Other automated subscriber loop testers are commercially available from other sources.

Remote isolation devices (RIDs) are connected between the telephone company's lines and the subscribers' equipment and used to momentarily isolate the subscribers' equipment from the telephone company's lines during testing by an automated loop tester to determine whether the source of a problem is either telephone company equipment or subscriber-owned equipment.

SUMMARY OF THE INVENTION

In general, the invention features automatically testing telephone lines by an improved approach that is based on the installation of test call units at the ends of telephone lines at which customers' telephones and other equipment are connected. Each test call unit has an initiation circuit that automatically initiates telephone line tests, a line test circuit that has detectors that make measurements of telephone line characteristics, and a circuit for transmitting the results of measurements of telephone line characteristics over the telephone line to a call collection unit that receives similar information from a large number of other test call units. An advantage of using such a test call unit at the end of each telephone line is that it permits tests that can be performed with the telephone line under normal operating conditions and does not involve disconnecting the line circuit as with the subscriber loop testers mentioned above.

In preferred embodiments, the test call unit has a clock that initiates the tests according to a predetermined schedule. The test call unit includes detectors for measuring such telephone line characteristics as idle line voltage, idle line noise, minimum line current off-hook, the existence of a dial tone, and the time from going off-hook to the initiation of a dial tone and the time to break dial tone. The test call unit also receives a data message that is transmitted over the telephone line from the call collection unit and retransmits the message to the call collection unit, where the accuracy of the received message is determined. The data message is sent over the telephone line as a modulated analog signal and is sent a plurality of times at different baud rates each time. The data message is also sent a plurality of times at varying amplitude of the data signal in order to determine a minimum amplitude at which intelligible transmission occurs on the telephone line. A dual-tone multi-frequency signal is also sent over the telephone line between the test call unit and the call collection unit, and characteristics of the received signal are determined (e.g., the amplitudes at different frequencies). The results of tests by detectors in a test call unit are stored at the call collection unit and are sent as part of test call summaries to a control unit. The control unit participates in the initialization of the test call unit when first installed by receiving a call from the test call unit and sending a station identification message over the telephone line to the test call unit. During installation, the control unit sends to the test call unit a message indicating the timing for initiating a line test including the frequency at which to periodically initiate line tests. The control unit also sends a message identifying a call collection unit with which the test call unit will perform line tests and identifying the telephone number of the control unit to be called in the event of default condition of the test call unit or call collection unit with which the test call unit performs tests. The control unit automatically, periodically generates fault reports and transmits them to a telephone operations support systems unit. The control unit may also send automatically generated fault reports to a security system control unit.

An advantage of such a system is that it permits testing of the transmission of signals over fiber optic links and digital line concentrators and permits the frequency of line test initiation to vary from one telephone line to another. In addition, it permits the telephone lines to be tested at a higher frequency than would be practical employing subscriber loop testers. In addition, the test call unit can test certain fault conditions that cannot be tested by typical subscriber loop testers.

Other advantages and features of the invention will be apparent from the following description of a preferred embodiment thereof and from the claims.

DESCRIPTION OF THE PREFERRED EMBODIMENT

The preferred embodiment will now be described.

DRAWINGS

STRUCTURE

Figure 1:
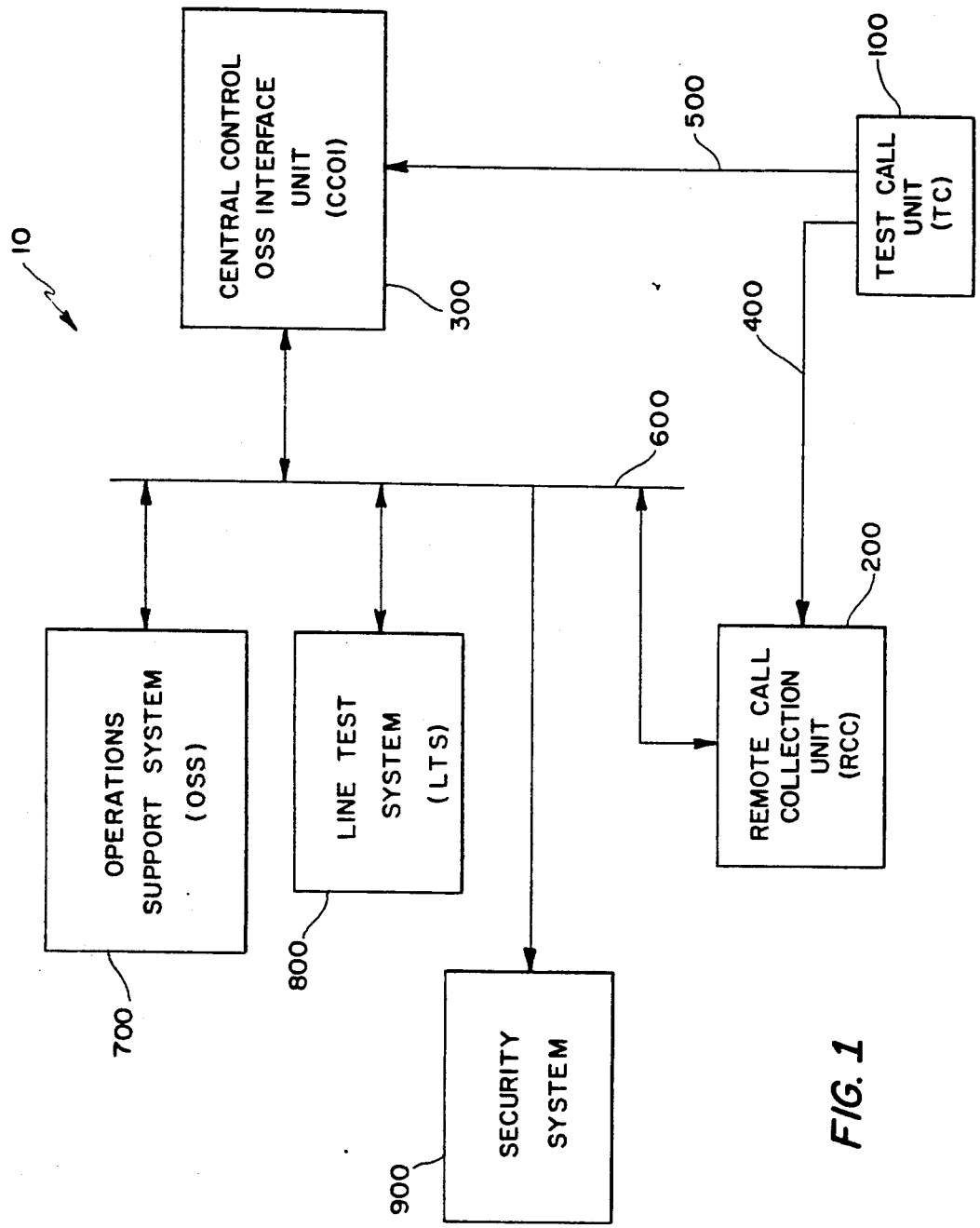
FIG. 1 is a block diagram showing an automatic telephone line test system according to the invention.

Referring to FIG. 1, there is shown automatic telephone line test system 10 employing a plurality of test call units 100 (only one of which is shown in FIG. 1). Test call units 100 are each installed at an end of a respective telephone line at which a customer's equipment is connected. The test call unit is shown diagrammatically connected over toll free dial-up paths 400, 500 through the public telephone network to remote call collection unit (RCC) 200 and central control/oss interface unit (CCOI) 300, respectively. A telephone company would typically have one CCOI 300 and a plurality of RCCs 200. RCC 200 and CCOI 300 are connected over X.25 telecommunications network 600 to each other, the telephone company's operation support system (OSS) 700, line test system (LTS) 800, and security system 900.

Figure 2:
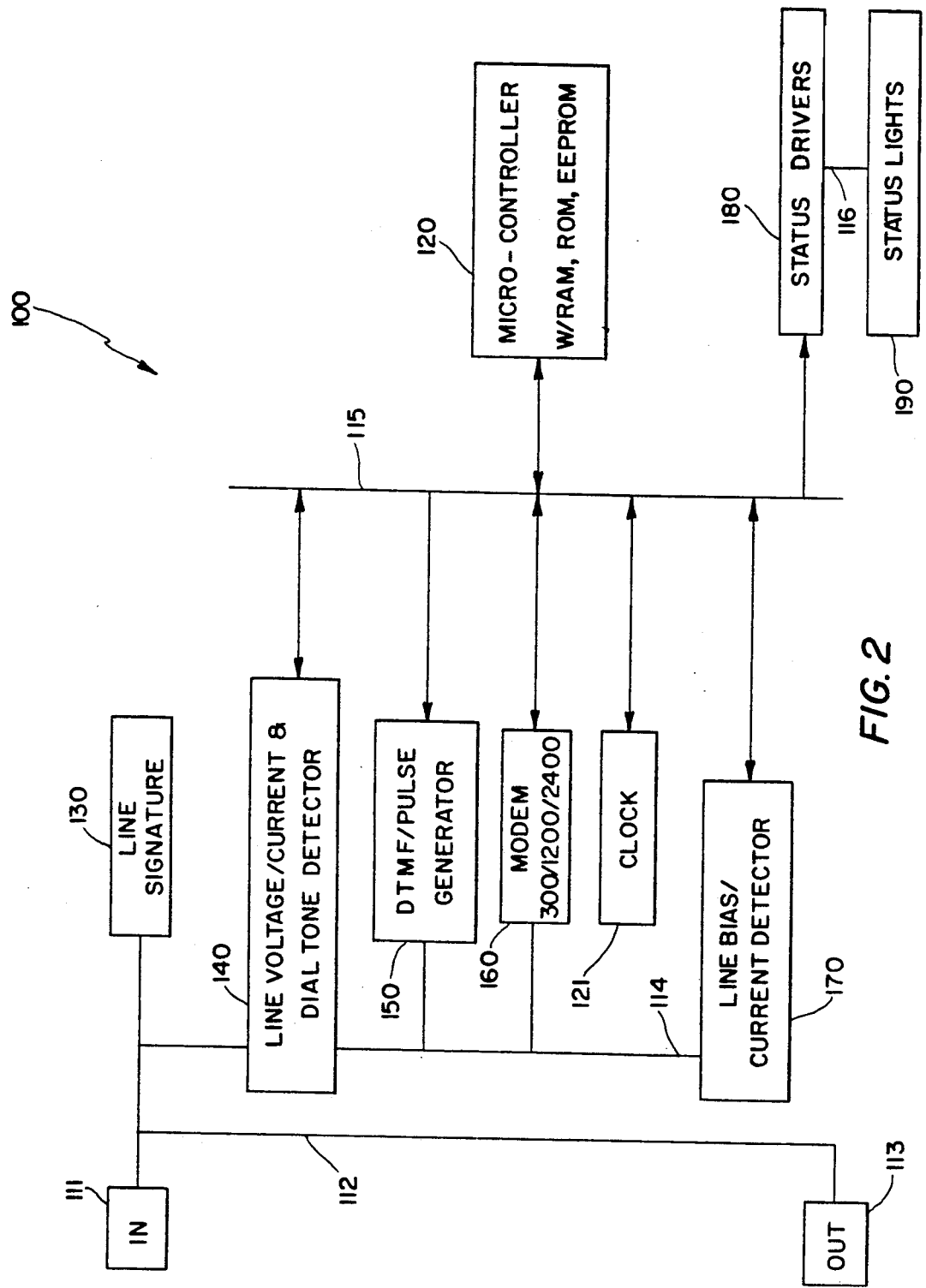
FIG. 2 is a block diagram of a test call unit of the FIG. 1 system.

Referring to FIG. 2, it is seen that test call unit 100 has input plug 111 which acts as a termination to make electrical access to a telephone company line via a phone jack at the customer's premises. Outlet jack 113 is connected via lines 112 to plug 111. Outlet jack 113 receives a plug for a customer's equipment. Input plug 111 is connected to line signature circuit 130 and line voltage/current & dial tone detector 140. The input on line 112 passes through detector 140 and is connected via line 114 to dual-tone multi-frequency (DTMF)/pulse generator 150 (e.g., a National Semiconductor TP5088 component), modem 160 (e.g., a Silicon Systems SSI K212 modem), and line bias/current detector 170. Detector 140, generator 150, modem 160, and detector 170 are connected over digital data and control bus 115 to micro-controller 120 (e.g., an INTEL SC 8OC51), which also communicates over bus 115 with clock 121 and status drivers 180, which are connected over lines 116 to control status indicator lights 190. Microcontroller 120 has RAM, ROM and EEPROM.

Figure 3:
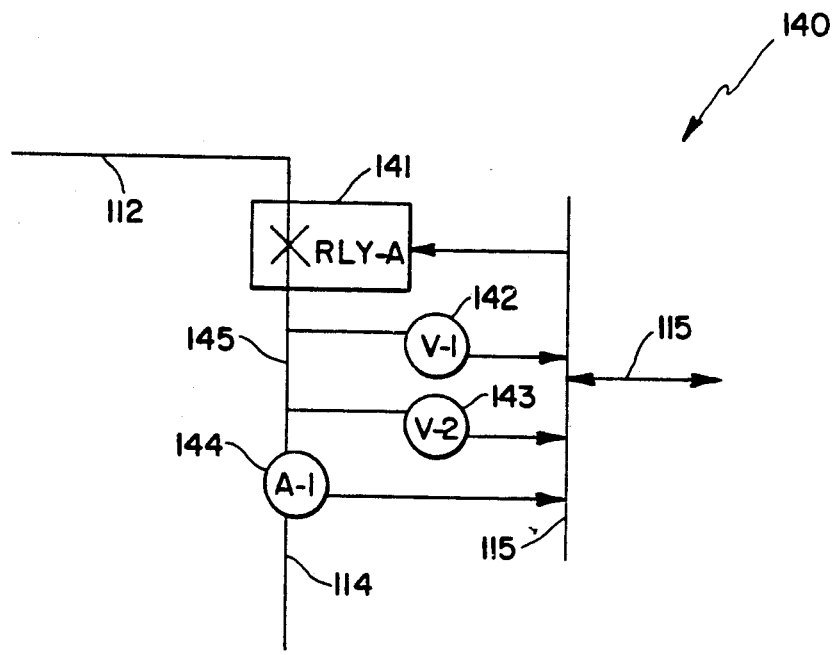
FIG. 3 is a block diagram of a line voltage/current & dial tone detector of the FIG. 2 test call unit.

Referring to FIG. 3, it is seen that line voltage/current & dial tone detector 140 includes normally open relay (A) 141, line 145, and DC ammeter (A-1) 144 (measurement range 0-500 ma, DC connected in series between line 112 and line 114. DC Voltmeter (V-1) 142 (measurement range 0-100 v, DC) and AC voltmeter (V-2) 143 (measurement range 0-500 v, peak, for frequencies from 10 Hz to 25kHz) are connected to measure voltage on line 145. Relay 141, voltmeters 142, 143 and ammeter 144 are connected to receive control signals from and provide digital data to bus 115.

Figure 4:
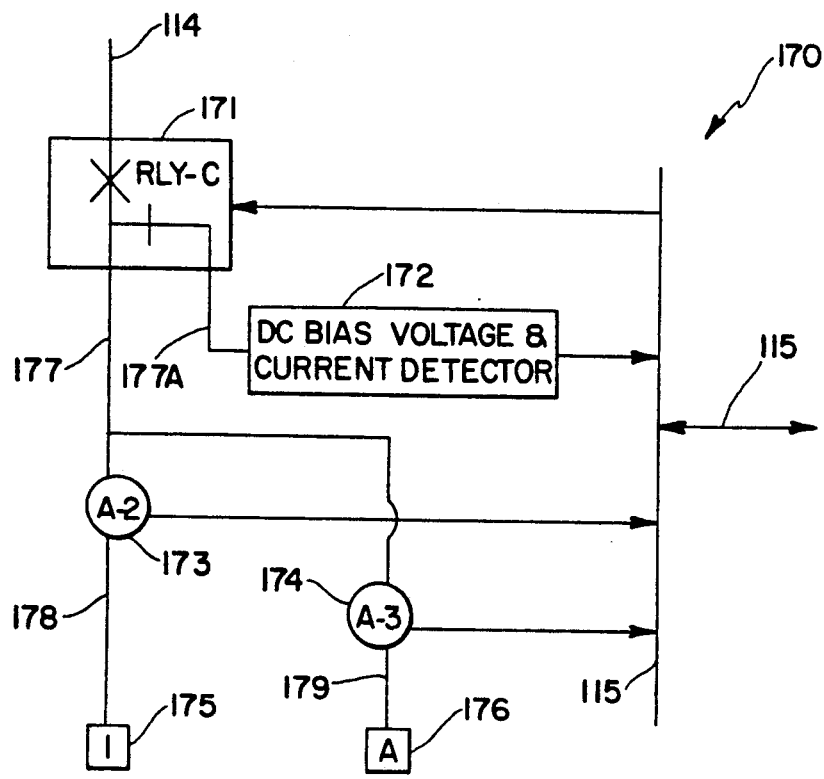
FIG. 4 is a block diagram of a line bias/current detector of the, FIG. 2 test call unit.

Referring to FIG. 4, line bias/current detector 170 includes relay unit (C) 171, having normally open relay 171A on the input from line 114 and two outputs, one being a direct connection to line 177 and the other being through normally closed relay 171B to DC bias voltage & current detector 172 via line 177A. Line 177 is connected to DC ammeter (A-2) 173 and DC ammeter (A-3) 174. Ammeter 173 is connected via line 178 to initialization jack (I) 175, used to receive a standard telephone connector during the initialization procedure. Ammeter 174 is connected via line 179 to auxiliary jack (A) 176. Relay unit 171 is connected to receive control signals from bus 115, and detector 172 and ammeters 173, 174 are connected to be controlled by and to provide digital data to bus 115.

Figure 5:
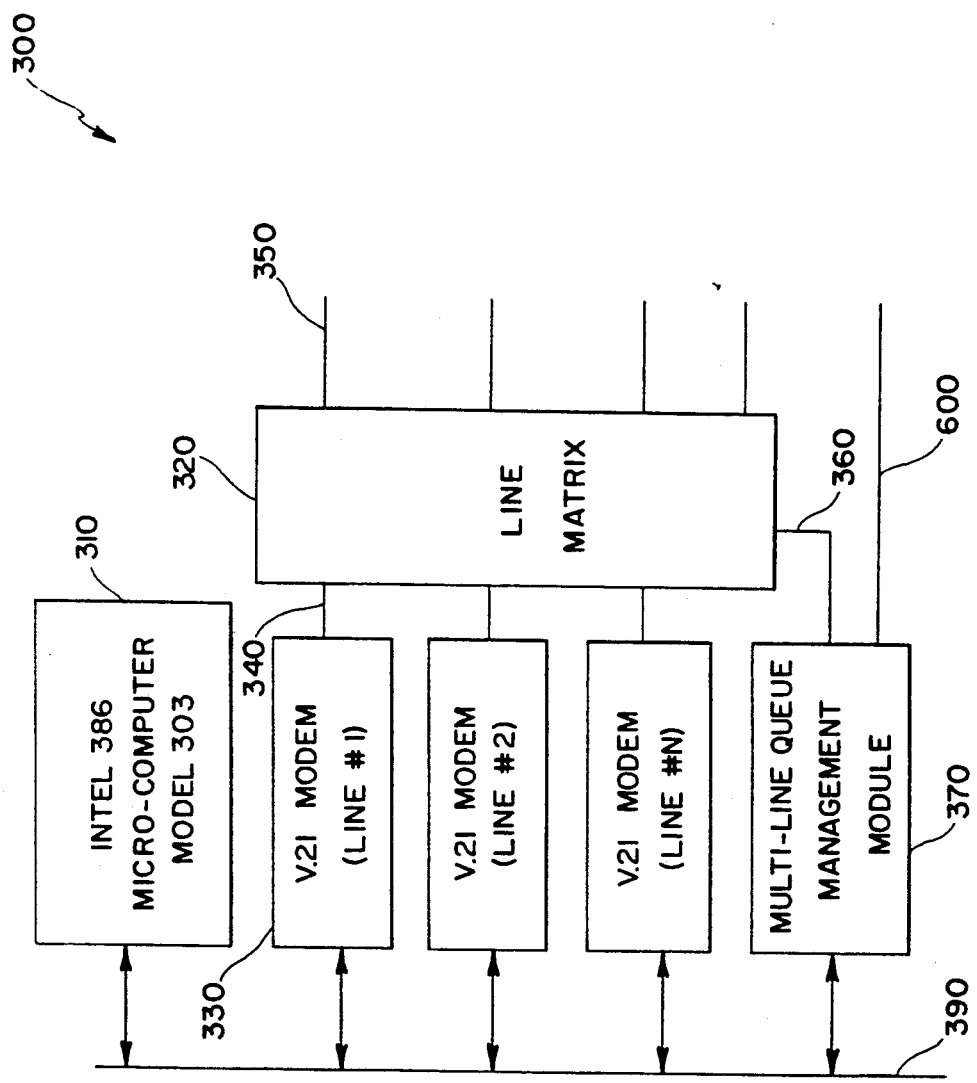
FIG. 5 is a block diagram of a central control/oss interface unit of the FIG. 1 system.

Referring to FIG. 5, CCOI 300 includes microcomputer 310 (an Intel 386 model 303), a plurality of V.21 modems 330, line matrix 320 and multi-line queue management module 370. (The multi-line queue management module consists of a micro-computer, equipped with RAM, ROM and EEPROM, with two functions. First, it monitors line matrix 320 to determine if incoming calls are being received on lines 350. When an incoming call is detected, it sends control signals to the line matrix to switch the incoming call to an idle modem 330 via lines 340. The second function is to provide an X.25 interface to line 600.) Modems 330 are connected to line matrix 320 via respective lines 340. Line matrix 320 connects one of the available modems 330 to a test call unit 100 via a line 350 of a telephone line hunt group. Micro-computer 310 communicates over internal bus 390 with modems 330 and multi-line queue management model 370.

Figure 6:
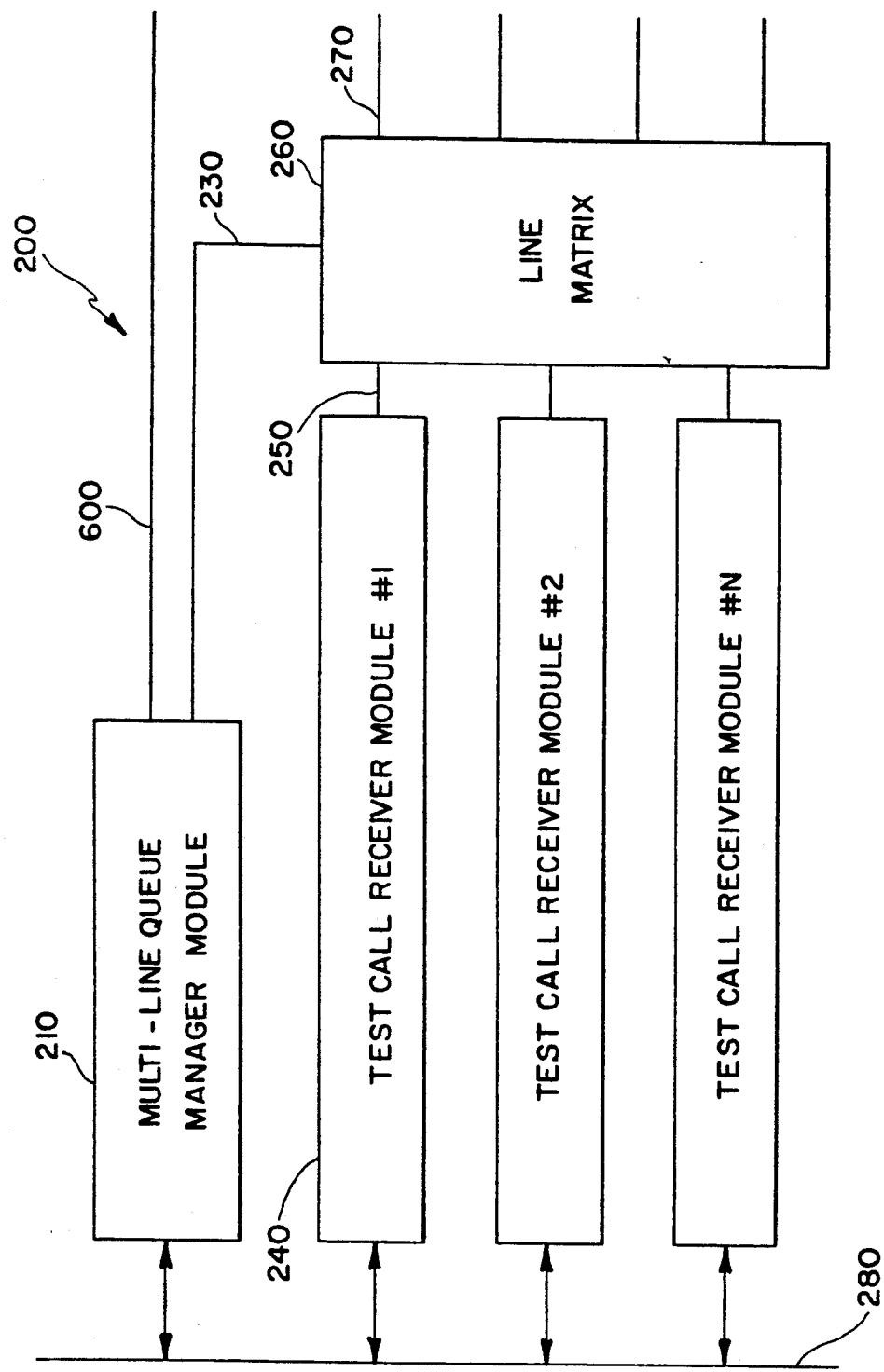
FIG. 6 is a block diagram of a remote call collection unit of the FIG. 1 system.

Referring to FIG. 6, RCC 200 includes multi-line queue manager module 210, a plurality of test call receiver modules 240, and line matrix 260. Modules 240 are connected to line matrix 260 via respective lines 250. Line matrix 260 connects one of the available test call receiver modules 240 to a test call unit 100 via a line 270 of a telephone line hunt group. Multi-line queue manager module 210 communicates over internal bus 280 with test call receiver modules 240.

Figure 7:
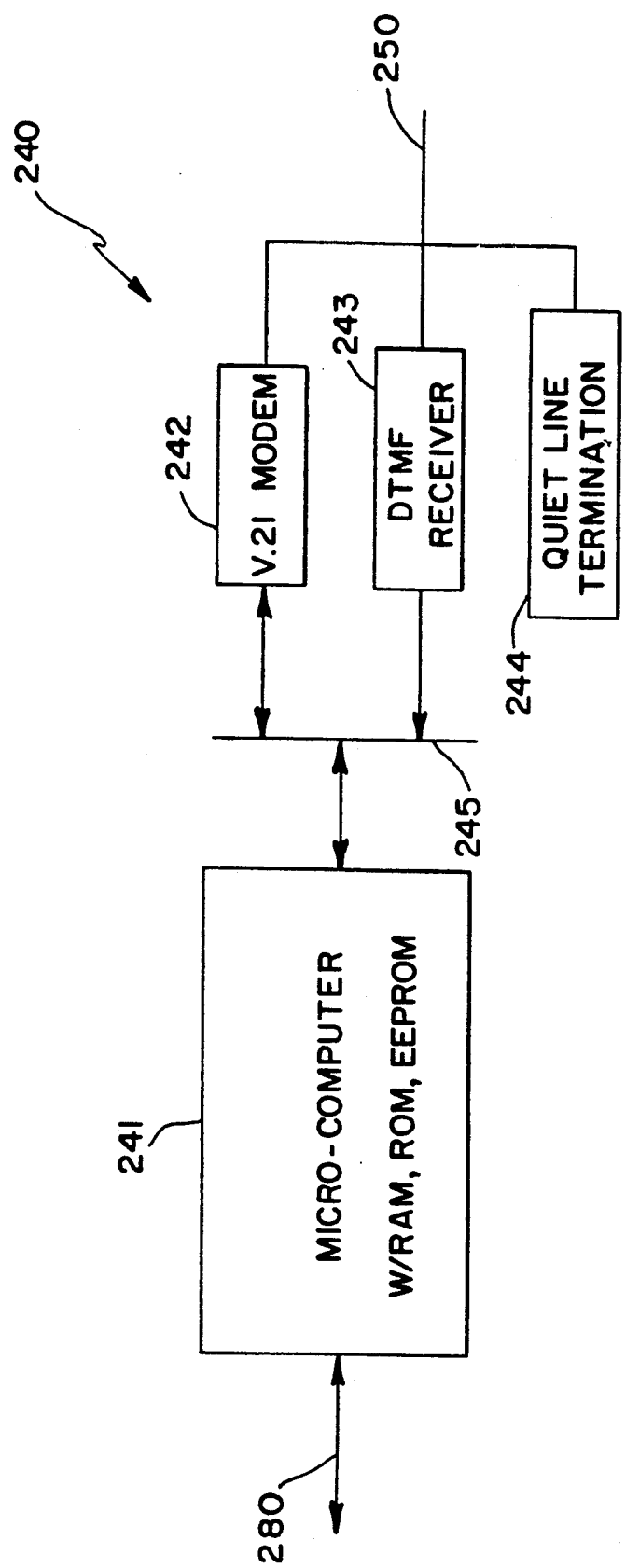
FIG. 7 is a block diagram of a test call receiver module of the FIG. 6 remote call collection unit.

Referring to FIG. 7, each test call receiver module 240 employs micro-computer 241, V.21 modem 242, DTMF receiver 243 (e.g., a Teltone M982 component), and quiet line termination 244. Micro-computer 241 has RAM, ROM and EEPROM. Micro-computer 241 communicates with modem 242 and DTMF receiver 243 over internal bus 245.

OPERATION

Figure 8A:
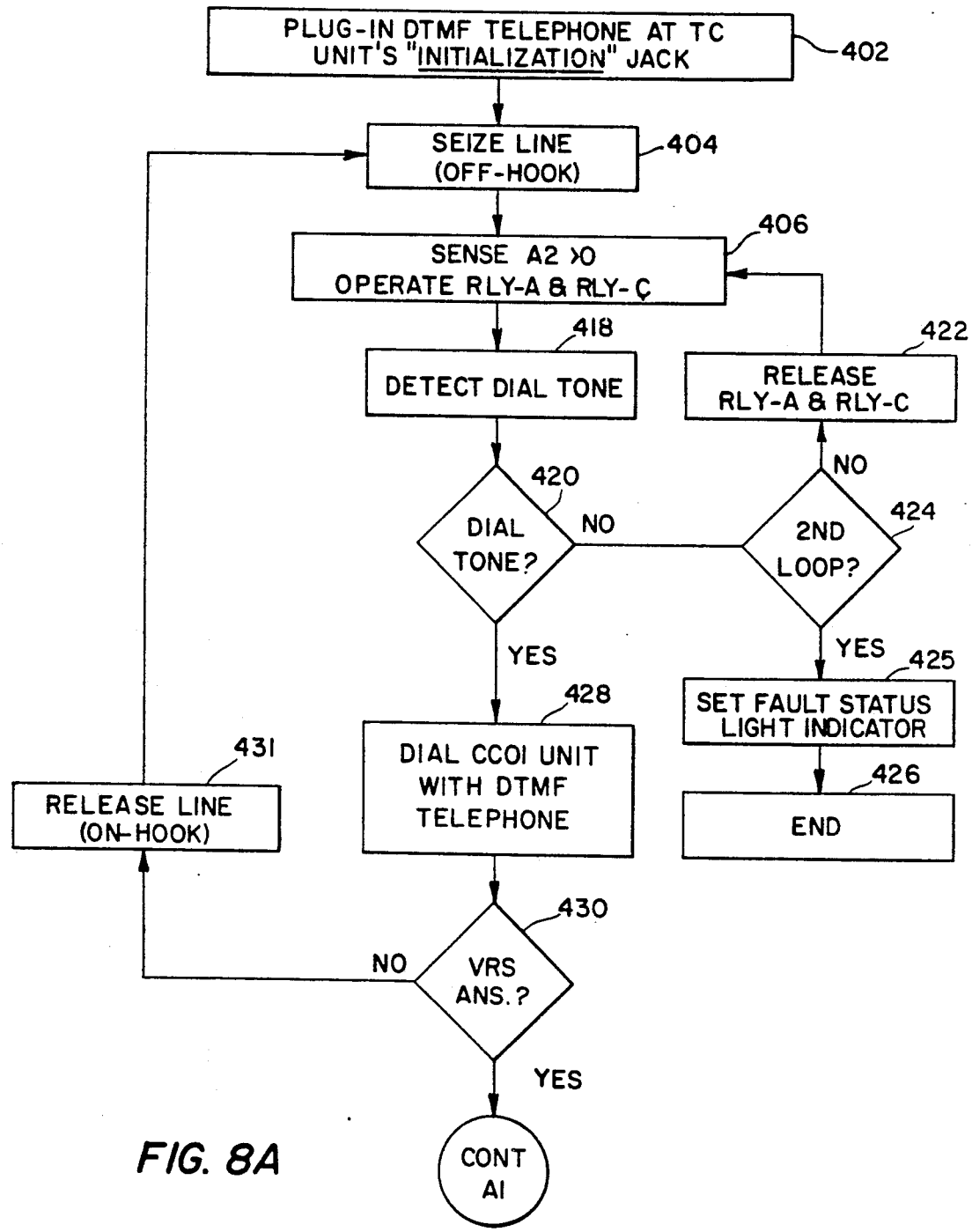
FIG. 8 is a flow chart describing the initialization process employed when the FIG. 2 test call unit is installed.
Figure 8B:
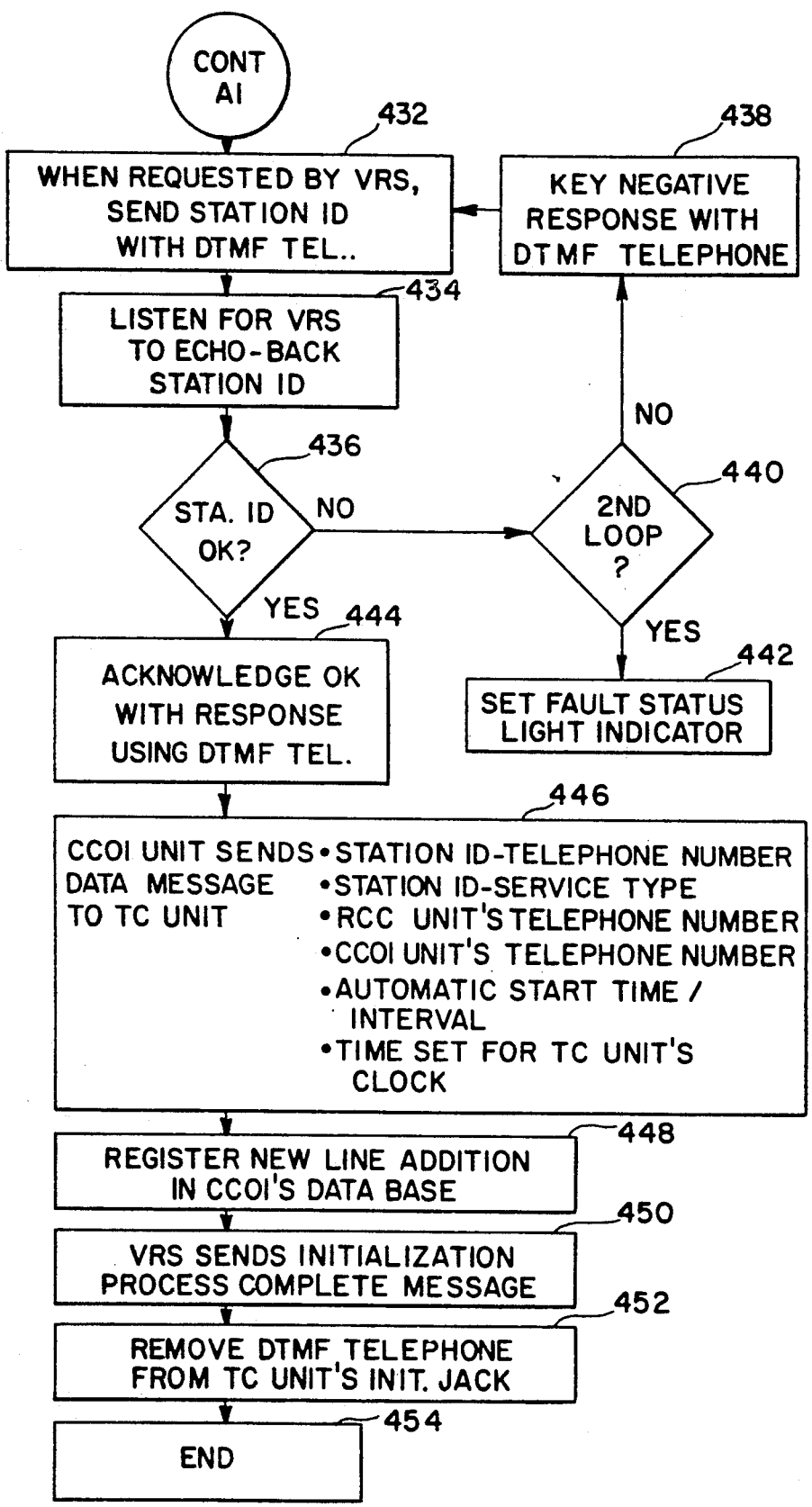
Figure 9A:
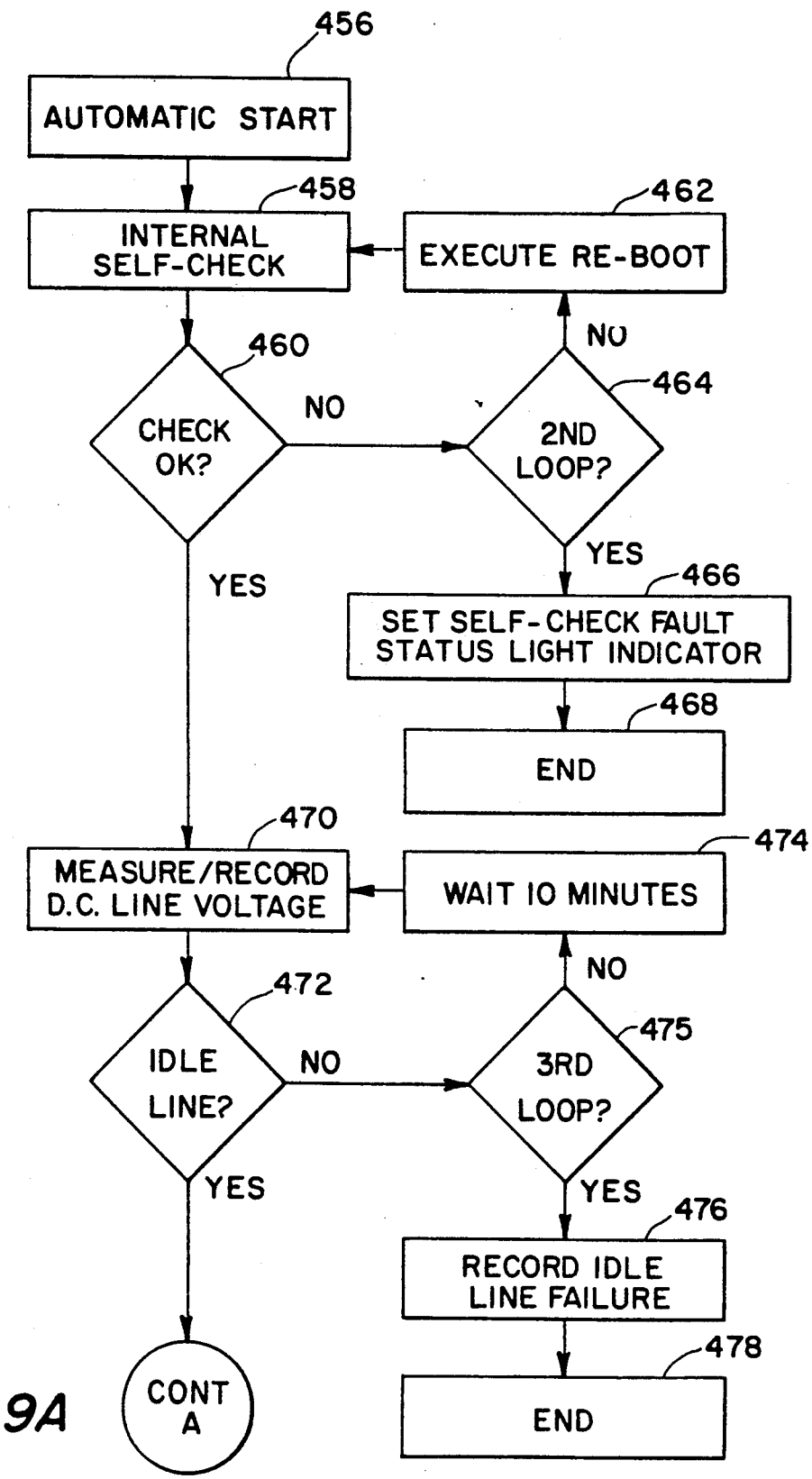
FIG. 9 is a flow chart describing the automatic line test procedure initiated by the FIG. 2 test call unit in conjunction with the FIG. 6 remote call collection unit.
Figure 9B:
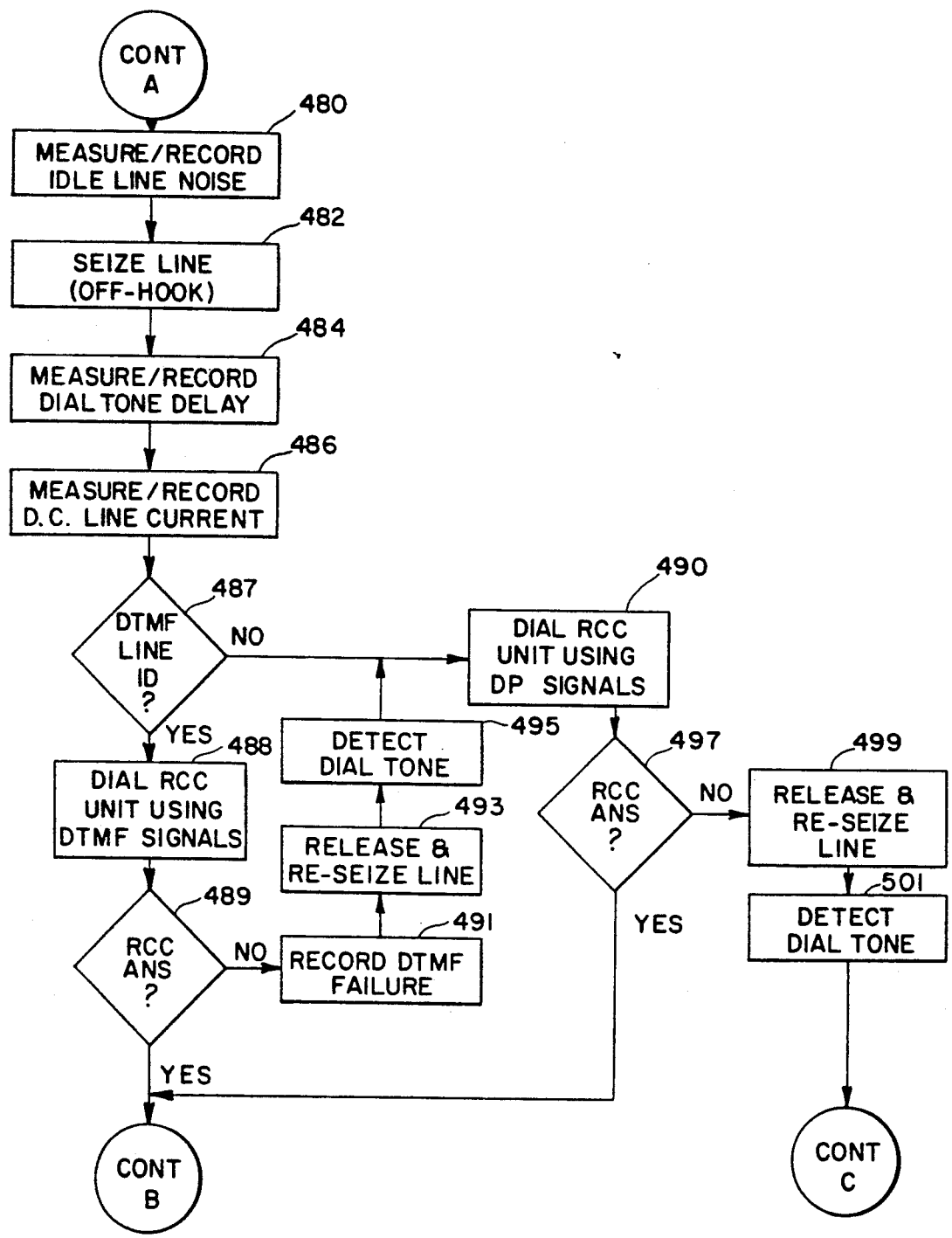
Figure 9C:
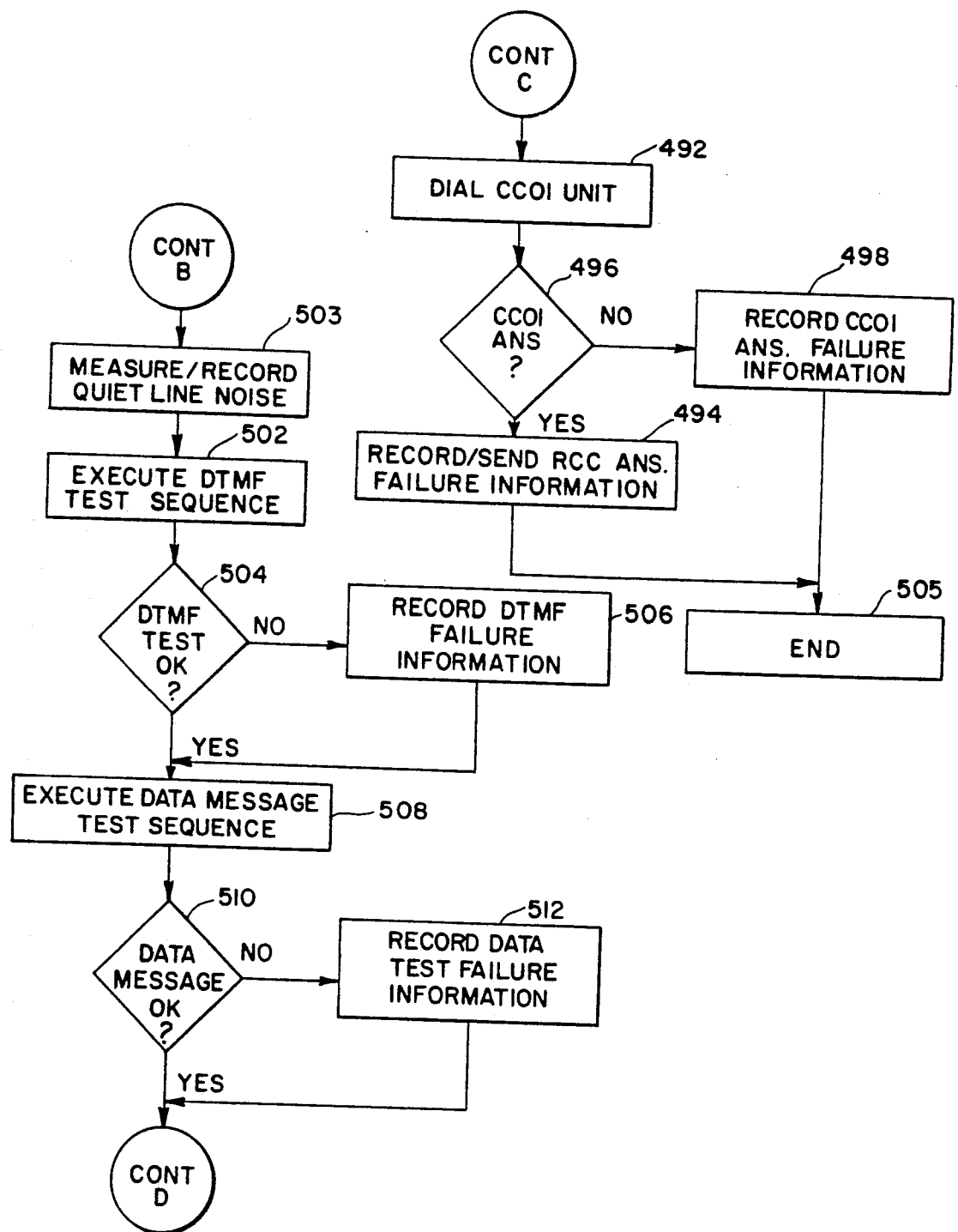
Figure 9D:
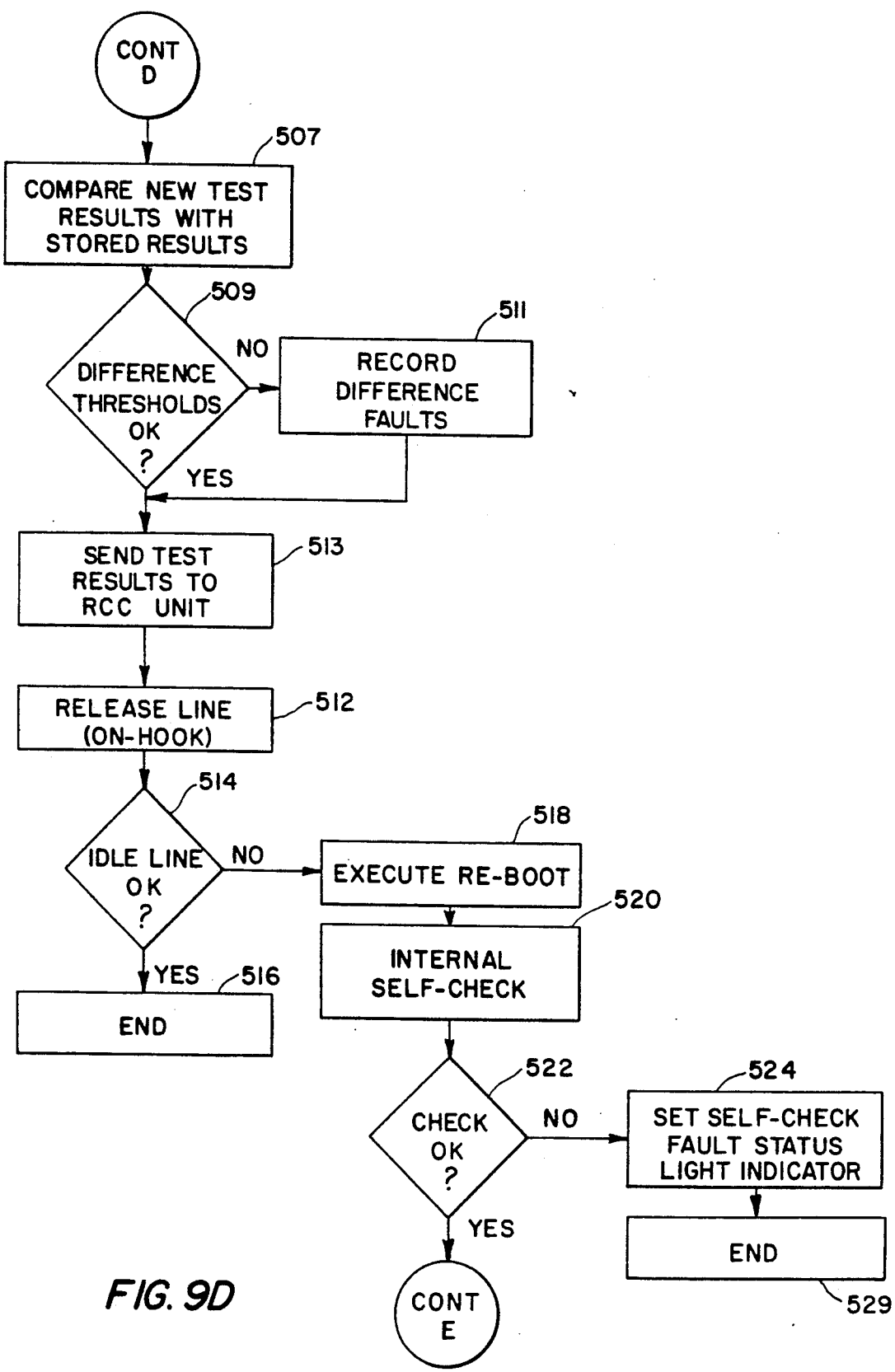
Figure 9E:
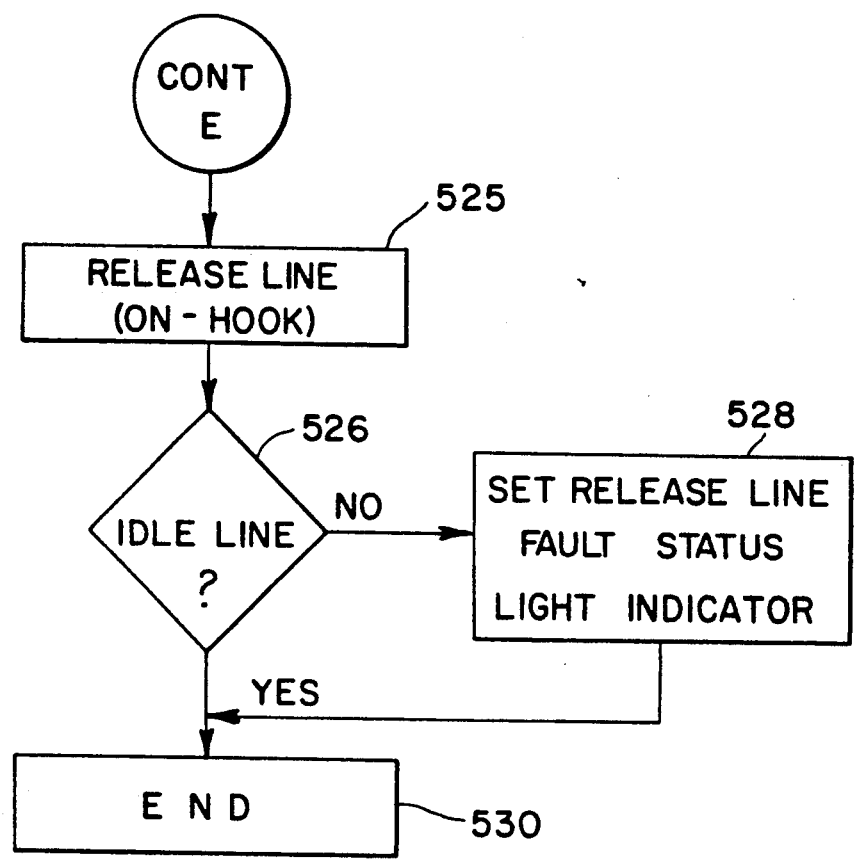

In operation, each test call unit 100 is installed by plugging plug 111 into a phone jack at the customer's premises and initializing test call unit 100 according to the procedure shown on FIG. 8. At step 402 of the FIG. 8 procedure, the installer's telephone is plugged into initialization jack 175 (FIG. 4). When the handset of the telephone plugged into jack 175 is lifted out of the cradle (step 404), ammeter 173 (FIG. 4) has current flowing through it, and this is communicated to micro-controller 120 (FIG. 2). Micro-controller 120 then sends control signals to close normally open relay 171A in line bias/current detector 170 and to close normally open relay 141 (FIG. 3) in line voltage/current & dial tone detector 140 (step 406). Having operated these relays, the telephone that is plugged into initialization jack 175 is now connected all the way through to plug 111 so that the telephone is now ready to make a telephone call to any point in the telephone network. The telephone network should provide a dial tone to the telephone at this time. If the dial tone is not detected by voltmeter 143 within a specified time (steps 418, 420), micro-controller 120 releases relays 141 and 171A at step 422 and returns to step 406. If a dial tone is not detected a second time (step 424), then a fault indicator light 190 is set (step 425), and the procedure is terminated (step 426). If a dial tone is provided, the installer hears it and then dials CCOI 300 using the dual-tone multi-frequency keys on his telephone (step 428). A voice response unit at CCOI 300 should answer the call (step 430); if not, the installer hangs up (returning the handset to the cradle) at step 431 and picks the handset up again, returning the procedure to step 404. Assuming that the voice response unit answers, it requests that the installer dial in the station identification number (IDN; e.g., the telephone number associated with the line) with the DTMF keys (step 432). The voice response unit echoes back the station IDN (step 434), and, if the station IDN is improper, the installer indicates a negative response with the DTMF keys (step 438). If the station IDN is not proper during a second try (step 440), the fault status indicator light 190 is set (step 442). If the station IDN is correct, the installer acknowledges this with the DTMF keys (step 444). CCOI 300 then sends a data message to test call unit 100 (step 446). This data message includes the station ID telephone number (IDN), the station ID service type, the telephone number for the RCC 200 assigned to this test call unit 100, the telephone number for CCOI 300, and the automatic start time/interval and the time set for clock 121. At step 448, CCOI 300 registers a new line addition in its data base, and its voice response unit sends an initialization process complete message (step 450) to test call unit 100. The installer then unplugs the telephone from jack 175 (step 452), completing the procedure (step 454).

Referring to FIG. 9, with test call unit 100 now initialized, its internal clock 121 keeps track of time, and micro-controller 120 automatically initiates a line test (step 456) at the times indicated in the data message sent from CCOI 300 to test call unit 100. Upon initiation of a line test, micro-controller 120 executes a series of self-check tests to make sure its internal components are operating satisfactorily (step 458). If the test results are unsatisfactory, a reboot of micro-controller 120's operating program is executed (step 462). If the self-operating check is unsatisfactory a second time (step 464), a self-check fault status light indicator 190 is set (step 466), and the procedure is ended (step 468). Assuming that the self-check tests are satisfactory, the DC line voltage is then measured by voltmeter 142 and recorded by microcontroller 120 (step 470). Micro-controller 120 determines if an idle line is present (step 472) by comparing the measured DC voltage with a predetermined range of voltages that indicate that the telephone line is idle. If an idle line is not detected, micro-controller 120 waits ten minutes (step 474) and initiates another measurement of DC line voltage. If an idle line is not detected after a third try (step 475; e.g., if the phone is busy or off the hook), then an idle line failure is recorded by micro-controller 120 (step 476), and the test procedure is ended (step 478). Assuming that an idle line voltage has been sensed by voltmeter 142, and the results have been stored in microcontroller 120, then the idle line noise is measured using AC voltmeter 143, and the result of the measurement is stored in micro-controller 120 (step 480). The line is then seized by DTMF/pulse generator 150 by closing an internal relay that shorts the tip and ring and completes the circuit (step 482). A dial tone, an AC signal having a specific voltage amplitude and frequency characteristic, should then be provided by the switching exchange. AC voltage measurements by voltmeter 143 are used by micro-controller 120 to determine when a dial tone has been presented to the line and to determine the time interval from the time the line was seized by DTMF pulse generator 150 and the time of detection of the dial tone, and this time is recorded in micro-controller 120 (step 484). The DC line current is then measured by ammeter 144 and recorded by microcontroller 120 (step 486). If the telephone line has DTMF capabilities (step 487), micro-controller 120 then controls DTMF generator 150 to break the dial tone and dial RCC 200 (step 488). If the telephone line does not have DTMF capabilities, or if RCC 200 does not answer the DTMF dialing (step 489), then RCC 200 is dialed using DP signals (step 490), the latter case including a recordal of DTMF failure by micro-controller 120 (step 491), a release and re-seize of the line (step 493), and a detection of dial tone (step 495) prior to dialing. If there is still a failure to have an answer from RCC 200 (step 497), the line is released and re-seized (step 499), a dial tone is detected (step 501), CCOI unit 300 is dialed (step 492), and the failure of RCC 200 to answer is reported to CCOI 300 (step 494). If CCOI 300 does not answer (step 496), then the failure of CCOI 300 to answer is recorded by micro-controller 120 (step 498). Assuming that RCC 200 does answer (step 489 or 497), RCC unit 200 switches in quiet line termination 244, and the quiet line noise is measured via voltmeter 143 and recorded by micro-controller 120 (step 503). A DTMF test sequence is then generated by DTMF generator 150 and sent to RCC 200 (step 502), where it is transmitted through line matrix 260 and a line 250 to DTMF receiver 243 of the test call receiver module 240 that has been assigned to this incoming call by queue manager module 210 (FIGS. 6 and 7). In the DTMF test sequence, test call unit 100 sends all of the DTMF tones that are possible, and RCC 200 measures the amplitude and frequency. The results of the DTMF test are reviewed by micro-controller 241 to determine whether the DTMF test was acceptable or not (step 504) and records whether those measurements were within specifications in micro-controller 120; if not, a DTMF failure message is recorded (step 506) before proceeding to the next step. Next a data message test sequence is executed (step 508). The RCC unit 200 sends a data message via its modem 242 in the connected test call receiver module 240. A message is first sent at 300 baud and is received by modem 160 in test call unit 100 and is then retransmitted to RCC unit 200 and compared with the original message to determine if there has been accurate transmission over the telephone line. The data message is then sent and retransmitted at 1200 baud and 2400 baud, and there are checks for accuracy. Additional data messages are sent over the telephone line a plurality of times at reduced amplitude of the data signal to determine a minimum amplitude at which intelligible data transmission occurs, and the minimum amplitude values are recorded. If it is determined that there has been a failure to send accurate data (step 510), a data test failure message is recorded by micro-controller 120 (step 512). micro-controller 120 compares the new test results with the previously recorded values for that telephone line (step 507), and, if the differences are greater than predetermined threshold values (step 509), the differences are recorded as faults (step 511). The current test results stored at micro-controller 120 and the recorded difference faults are then transmitted to RCC 200 (step 513). DTMF/pulse generator 150 then releases the line (step 512), and the idle line voltage is measured by voltmeter 142 and compared with the idle line voltage that had been detected earlier in the present line test. If the idle line voltage and comparison are acceptable, the test call sequence is ended (step 516). If not (e.g., the line might not have been released), microcontroller 120 executes a re-boot (step 518), executes an internal self-check process (step 520), and, if the self-check is not acceptable (step 522), the self-check fault indicator is set (step 524), and the test process is ended (step 529). If the self-check test is acceptable, the line is released (step 525), and the line voltage is sensed again to see if the line is idle (step 526). If the line does not appear to be idle, the release line fault indicator is set (step 528). The test process is then ended (step 530).

Figure 10:
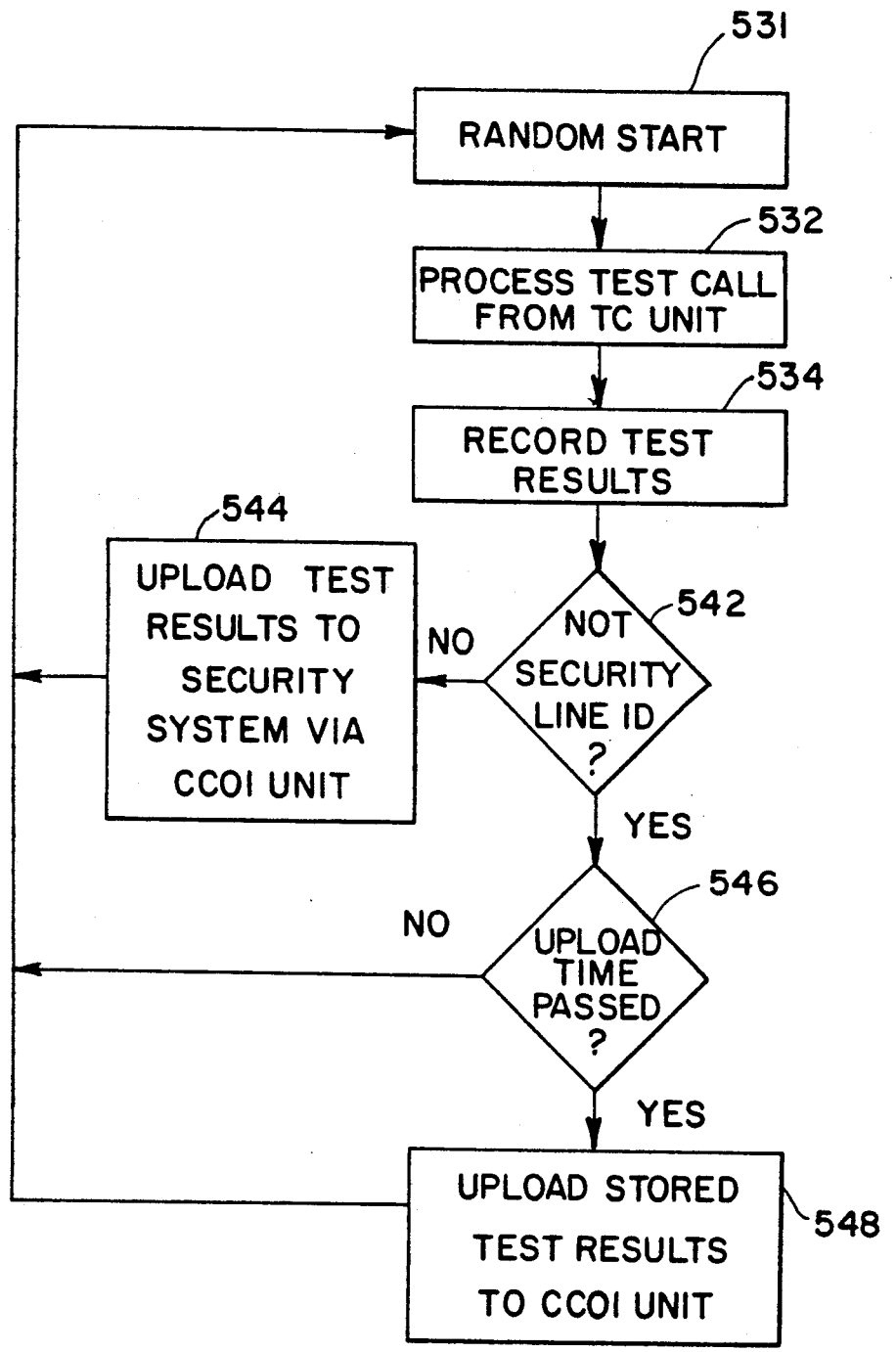
FIG. 10 is a flow chart describing a method of generating test call reports and transmitting them from the remote call collection unit to the central control/oss interface unit.

Referring to FIG. 10, RCC 200 has a plurality of test call receiver modules 240 that are sequentially connected to test call units 100 and sequentially process line tests as the calls from the various test call units 100 are received by RCC 200, as was just described with respect to FIG. 9; this is the processing referred to as step 532 in FIG. 10. The test results for the various test call units 100 assigned to a particular RCC 200 are stored in multiline queue manager 210 (step 534). If new test results are received for a telephone line associated with a security system (step 542), the test results are immediately uploaded to security system 900 (step 544). Test results for other telephone lines are uploaded to CCOI 300 on a periodic basis (steps 546 and 548). E.g. test results can be uploaded to CCOI 300 on an hourly basis.

Figure 11:
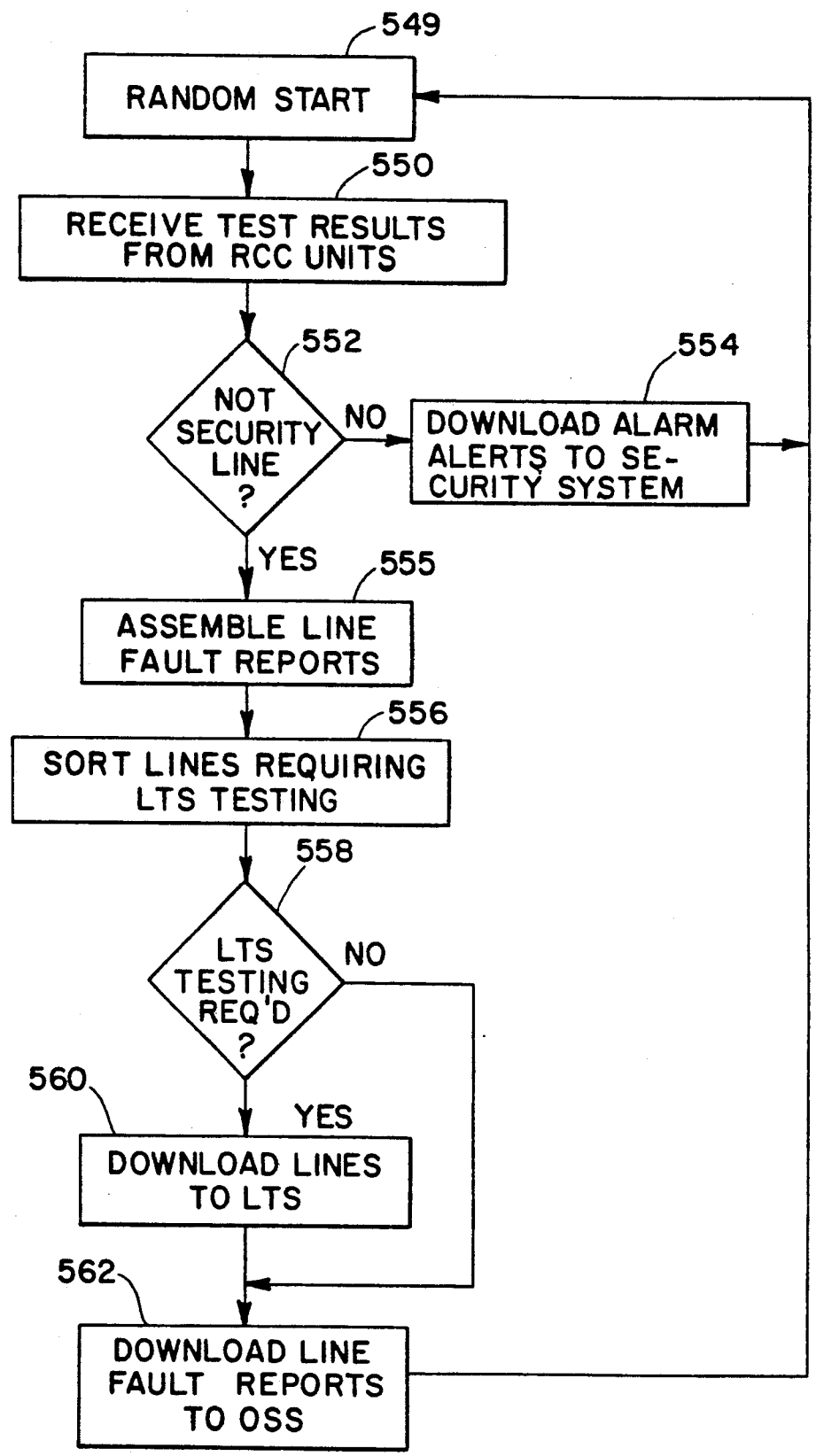
FIG. 11 is a flow chart describing a method of generating line fault reports and transmitting them from the central control/oss interface unit to the line test system.

Referring to FIG. 11, CCOI 200 receives the test results from RCCs 300 at step 550. If it is determined that there is a security line involved (step 552), alarm alerts are downloaded to security system 900 (step 554). If security lines are not involved, then line fault reports are assembled (step 555), and the telephone lines are sorted into those that require LTS testing and those that do not (step 556). If some lines require LTS testing (step 558), the results for those lines are downloaded to LTS 800 (step 560). A line fault report is then downloaded to OSS 700 (step 562).

Figure 12A:
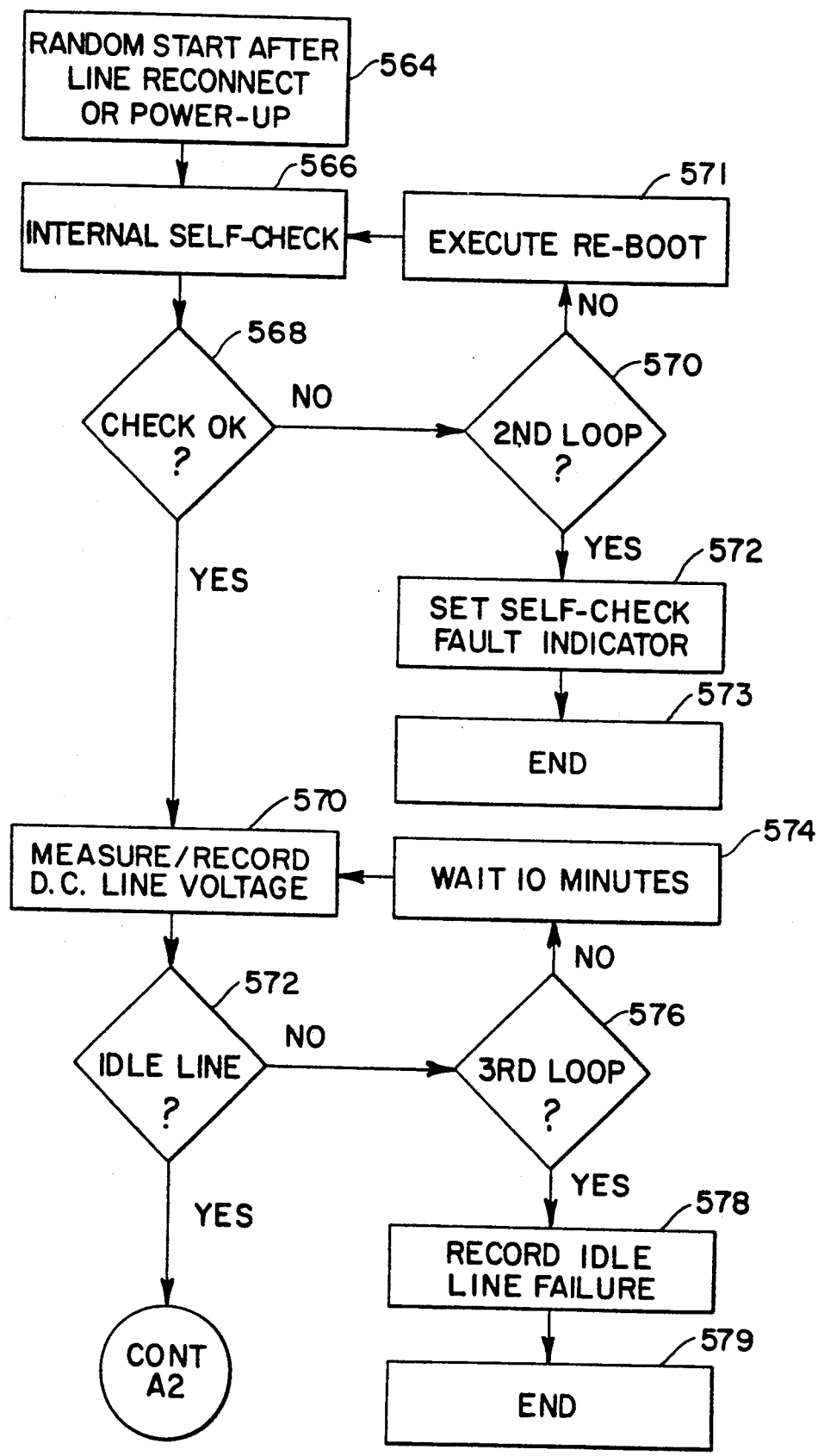
FIG. 12 is a flow chart describing a method employed by the test call unit upon reconnection of a telephone line.
Figure 12B:
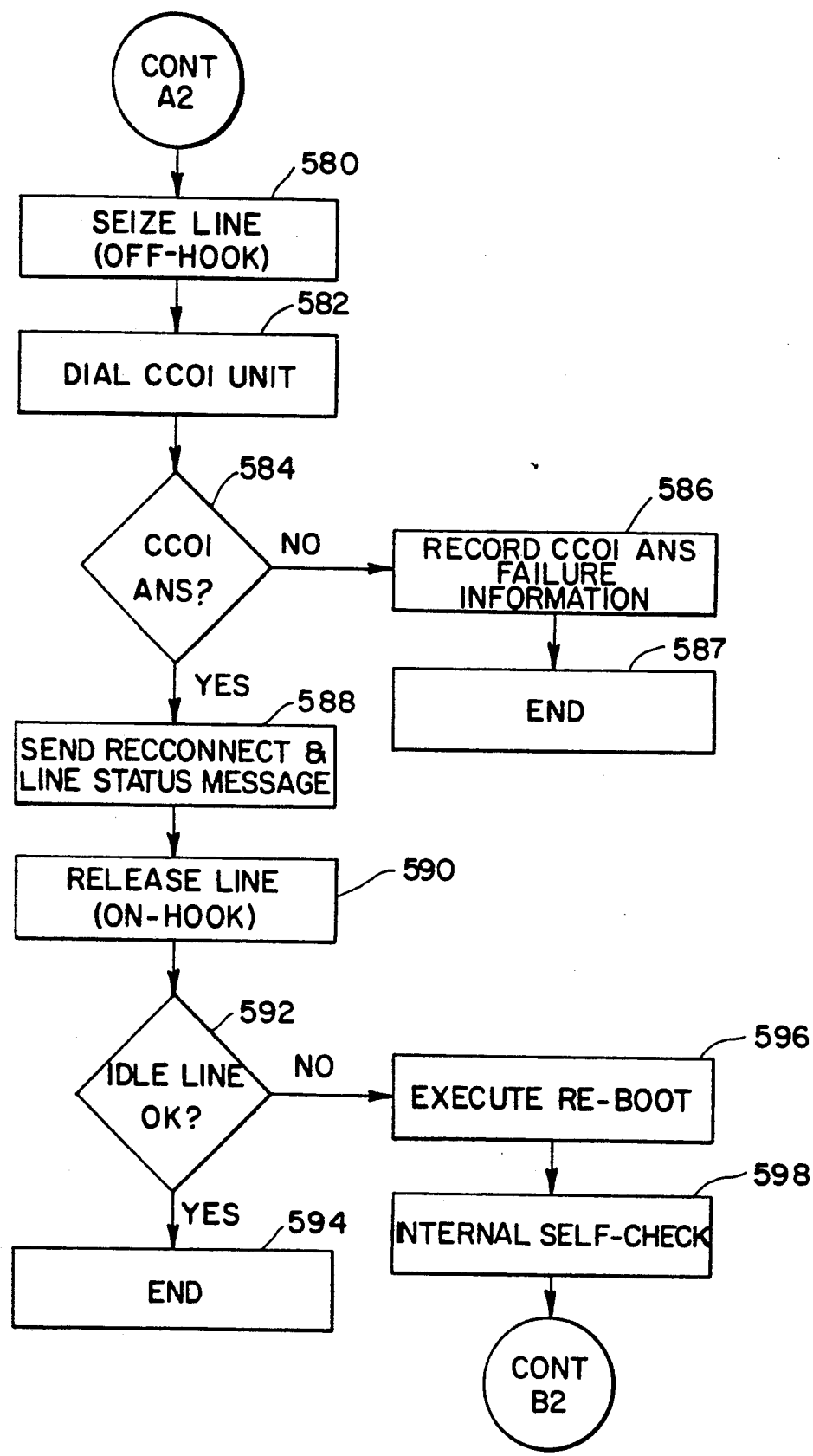
Figure 12C:
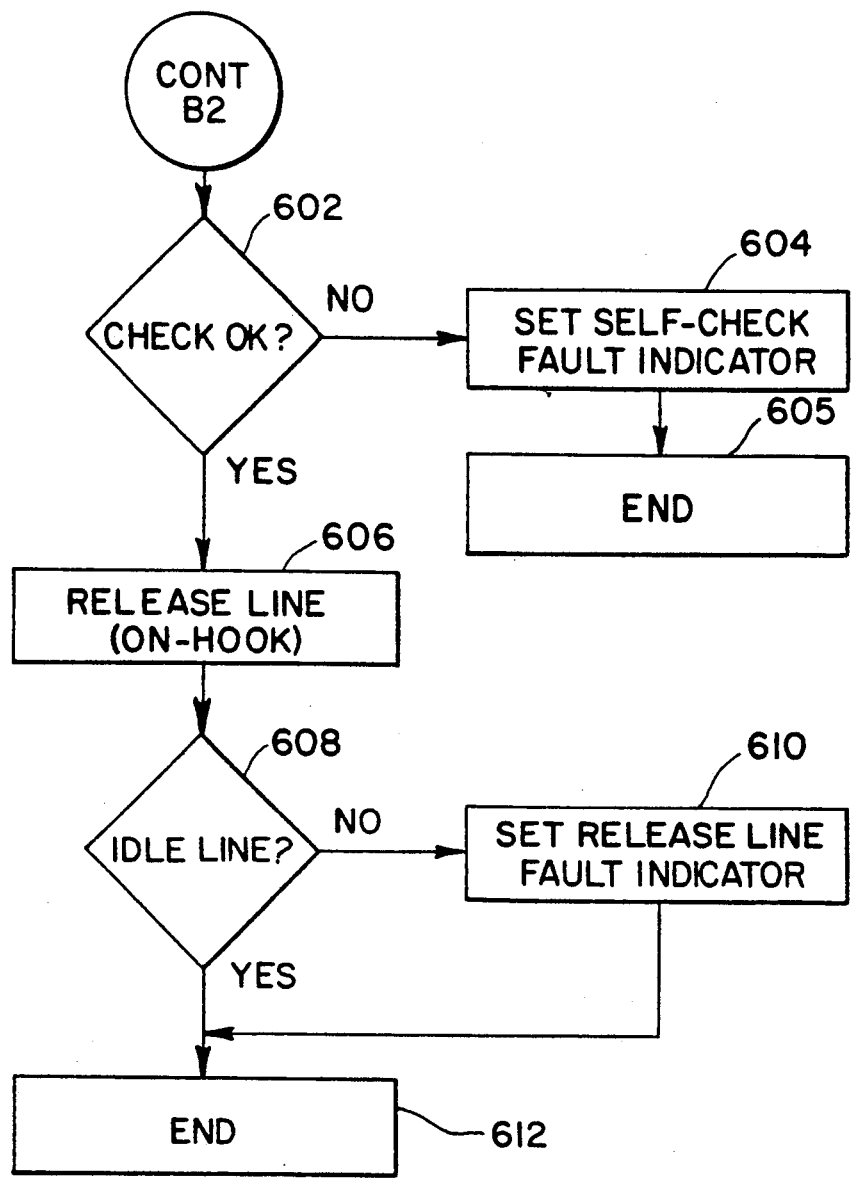

Referring to FIG. 12, if test call unit 100 is disconnected from the telephone jack or powered up after a lack of power, it performs the reconnect alert process described on FIG. 12. If the internal self-check test (step 566) is not satisfactory (step 568), two attempts will be made to execute the reboot program before setting self-check fault indicator light 190 (steps 570-573). If the self-check test is satisfactory, the DC line voltage is measured by voltmeter 142 and recorded by micro-controller 120 (step 570), and three attempts are made to determine if the line is idle (steps 572-579), employing the same procedure described with respect to steps 470-472 of FIG. 9. Assuming that an idle line is sensed, the telephone line is seized by the DTMF/pulse generator 150 (step 580), and CCOI 300 is dialed (step 582). If CCOI 300 does not answer (step 584), the failure information is recorded by microcontroller 120 (step 586), and the procedure is ended (step 587). If CCOI 300 answers, then a reconnect and line status message is sent from test call unit 100 to CCOI 300 (step 588), and the line is released (step 590). The idle line is then checked before ending the procedure (steps 592-612), employing the same procedure as described above in connection with steps 514-530 of FIG. 9.

Figure 13:
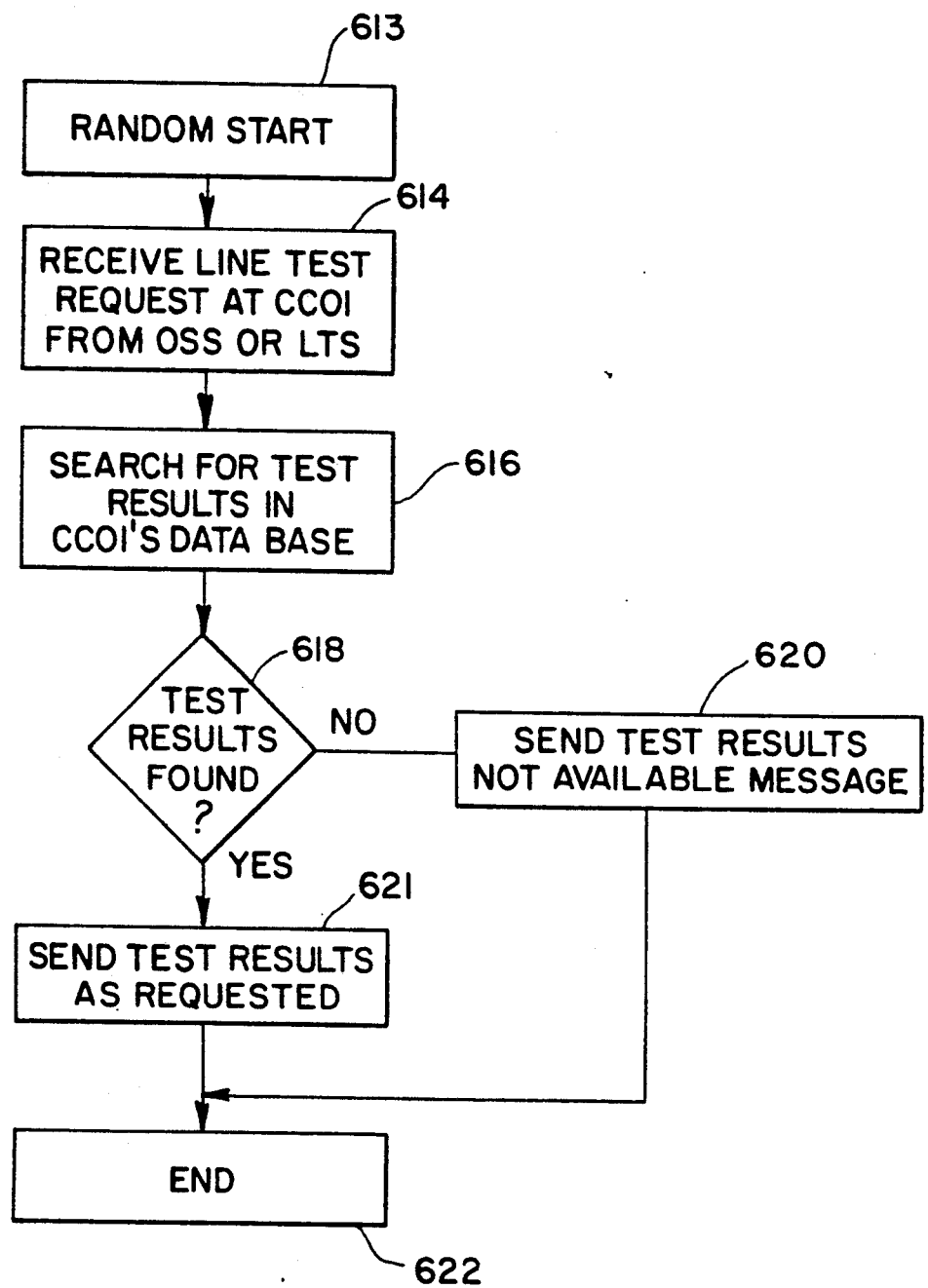
FIG. 13 is a flow chart describing a method of requesting line test reports by the operation support system or the line test system.

Referring to FIG. 13, OSS 700 or LTS 800 can request test results stored in CCOI 300 according to the procedure set forth on FIG. 13. When CCOI 300 receives a line test request (step 614), it searches for the results in its data base (step 616). If the results are not found (step 618), a "results not available" message is sent to the requesting entity (step 620). If the results are found, they are sent to the requesting entity (step 621). The procedure is then ended (step 622).

OTHER EMBODIMENTS

Other embodiments of the invention are within the scope of the appended claims.

What is claimed is:

1. A method of testing a telephone line comprising
installing a test call unit at an end of said telephone line at which a customer's equipment is connected,
automatically initiating a telephone line test at said test call unit,
performing said telephone line test, said performing including measuring telephone line characteristics by detectors in said test call unit, and
transmitting results of tests by said detectors over said telephone line to a call collection unit.

2. The method of claim 1 wherein said test is initiated at a predetermined time by a clock in said test call unit.

3. The method of claim 2 wherein said test call unit initiates line tests according to a predetermined schedule.

4. The method of claim 1 wherein said characteristics include line voltage.

5. The method of claim 4 further comprising determining if said telephone is in use or is idle from the results of measurement of said line voltage.

6. The method of claim 2 wherein said characteristics include idle line noise.

7. The method of claim 1 wherein said performing includes taking the line off-hook at said test call unit, and said characteristics include minimum line current off-hook.

8. The method of claim 1 wherein said performing includes taking the line off-hook at said test call unit, and said characteristics include the existence of a dial tone.

9. The method of claim 1 wherein said performing includes taking the line off-hook at said test call unit, and said characteristics include the time from going off-hook to the initiation of a dial tone.

10. The method of claim 1 wherein said performing includes
taking said telephone line off-hook at said test call unit,
dialing a call collection unit from said test call unit, and
establishing a connection between the test call unit and the call collection unit.

11. The method of claim 10 wherein said performing includes making a quiet line noise measurement.

12. The method of claim 10 wherein said performing includes sending a data message over said telephone line between said call collection unit and said test call unit and checking the accuracy of the message received.

13. The method of claim 12 wherein said data message is sent from said call collection unit to said test call unit and is then resent from said test call unit to said call collection unit.

14. The method of claim 12 wherein said data message is sent over said telephone line as a modulated analog signal.

15. The method of claim 12 wherein said data message is sent over said telephone line as a modulated analog signal at different baud rates.

16. The method of claim 12 wherein said data message is sent at different amplitudes of the data signal to determine a minimum amplitude at which intelligible data transmission occurs.

17. The method of claim 10 wherein a dual-tone multi-frequency signal is sent over said telephone line between said test call unit and said call collection unit, and a characteristic of said signal is sensed after transmission over said telephone line.

18. The method of claim 17 wherein a plurality of different dual-tone multi-frequency signals are sent over said telephone line between said test call unit and said call collection unit, and characteristics of said signals are sensed after transmission over said telephone line.

19. The method of claim 18 wherein said characteristics of said signals sensed after transmission over said telephone line include the amplitude at different frequencies.

20. The method of claim 17 wherein said dual-tone multi-frequency signal is sent from said test call unit and is received by and sensed at said call collection unit.

21. The method of claim 18 wherein said dual-tone multi-frequency signal is sent from said test call unit and is received by and sensed at said call collection unit.

22. The method of claim 1 wherein said installing includes
electrically connecting said test call unit to said end of said telephone line,
taking said telephone line off-hook at said test call unit,
dialing a control unit and establishing a connection between said test call unit and said control unit, and
sending a station identification message over said telephone line to said control unit.

23. The method of claim 22 wherein said installing includes sending a station identification message over said line from said control unit.

24. The method of claim 22 wherein said test call unit includes a clock, and wherein said installing includes sending a message indicating timing for initiating a line test at said test call unit.

25. The method of claim 24 wherein said message indicates a frequency at which to periodically initiate line tests.

26. The method of claim 24 wherein said message indicates the time of day and the date, and said clock is set by the time of day and date of said message.

27. The method of claim 22 wherein said installing includes sending a message identifying a call collection unit with which said test call unit is assigned to perform said line test.

28. The method of claim 27 wherein said installing includes sending a message identifying the telephone number of a call control unit to be called in the event of a default condition of the test call unit or a default condition of a call collection unit with which said test call unit performs tests.

29. The method of claim 1 wherein a plurality of test call units are installed at ends of said telephone lines, and said plurality automatically initiate and perform telephone line tests and transmit results of tests to said call collection unit, and wherein test call summaries are automatically, periodically sent from said call collection unit to a control unit.

30. The method of claim 29 wherein said control unit automatically, periodically generates fault reports based upon said test call summaries and transmits them to a telephone operations support systems unit 31. The method of claim 29 wherein said control unit automatically generates fault reports and transmits them to a security system control unit.

32. A test call unit for testing a telephone line comprising
a termination for making electrical access to an end of said telephone line at which a customer's equipment is connected,
an initiation circuit for automatically initiating a telephone line test,
a line test circuit that is connected to said termination and said initiation circuit and is responsive to said initiation circuit to perform said line test, said line test circuit including detectors that measure telephone line characteristics, and
means for transmitting results of tests by said line test circuit over said telephone line to a call collection unit.

33. The unit of claim 32 wherein said initiation circuit includes a clock for initiating a line test at said test module at a predetermined time.

34. The unit of claim 32 wherein said line test circuit includes a detector that measures line voltage.

35. The unit of claim 32 wherein said line test circuit includes a detector that measures idle line noise.

36. The unit of claim 32 wherein said line test circuit includes a detector that measures minimum line current off-hook.

37. The unit of claim 32 wherein said line test circuit includes a detector that measures the existence of a dial tone.

38. The unit of claim 32 further comprising means for taking said telephone line off-hook at said test call unit, and wherein said line test circuit includes a detector that measures the time from going off-hook to the initiation of a dial tone.

39. The unit of claim 32 further comprising
means for taking said telephone line off-hook at said test call unit,
means for dialing a call collection unit from said test call unit, and
means for establishing a connection between the test call unit and the call collection unit.

40. The unit of claim 39 wherein said line test circuit includes means for making a quiet line noise measurement.

41. The unit of claim 39 further comprising a multi-frequency sender.

42. An automatic telephone line test system comprising
a plurality of test call units installed at remote ends of respective telephone lines, each said unit comprising an initiation circuit for automatically initiating a telephone line test, and a line test circuit that is connected to said telephone line and said initiation circuit and is responsive to said initiation circuit to perform said line test, and
a call collection unit connected to communicate with said test call units over said telephone lines and including means to interact with said test call units relative to telephone line tests.

43. The system of claim 42 wherein said call collection unit includes means to send a data message over a said telephone line to a said test call unit, and said line test circuit includes means to receive said data message and transmit it back over said telephone line to said call collection unit.

44. The system of claim 43 wherein said test call units include means to transmit the results of telephone line tests, and said call collection unit includes means to receive said results.

45. The system of claim 44 further comprising a control unit connected to communicate with said call collection unit, said call collection unit including means for generating and transmitting test call summaries, said control unit including means for receiving said test call summaries.

46. The system of claim 45 wherein said control unit includes means for automatically generating fault reports and transmitting them to a security system control unit.

47. The system of claim 46 wherein said control unit includes means to communicate with said test call units over said telephone lines.

* * * * *